(No Model.)

J. O. FORD.
CULTIVATOR.

No. 442,876. Patented Dec. 16, 1890.

Witnesses:
E. P. Ellis,
B. Brockett.

Inventor:
J. O. Ford,
per
Lehmann & Pattison,
Attys.

UNITED STATES PATENT OFFICE.

JOHN OWEN FORD, OF HOLLIS, TEXAS.

CULTIVATOR.

SPECIFICATION forming part of Letters Patent No. 442,876, dated December 16, 1890.

Application filed September 5, 1890. Serial No. 363,979. (No model.)

*To all whom it may concern:*

Be it known that I, JOHN OWEN FORD, of Hollis, in the county of Madison and State of Texas, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators; and it consists in the combination and arrangements of parts, which will be fully described hereinafter, and pointed out in the claims.

The object of my invention is to produce an agricultural implement in which the cultivators can be adjusted laterally in relation to each other and turned at any desired angle, and in which the frame and the beam can be made to stand at any desired angle to each other.

Figure 1:
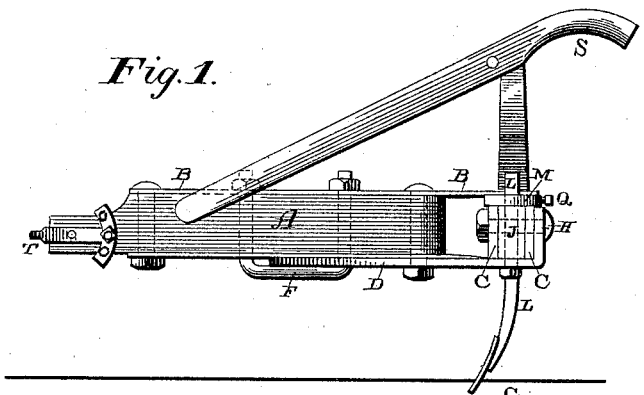
Figure 2:
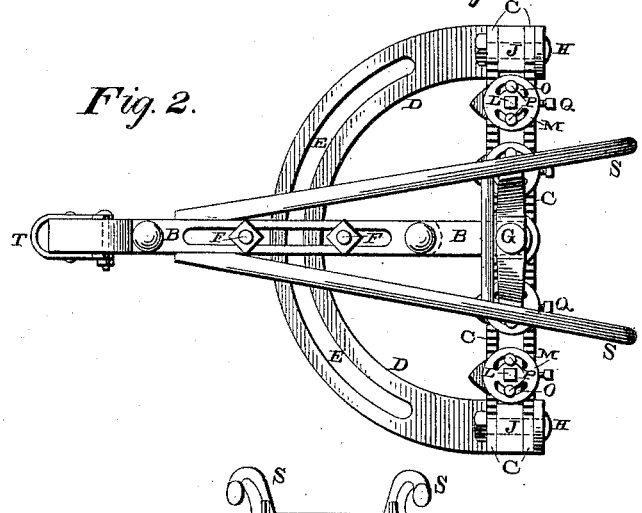
Figure 3:
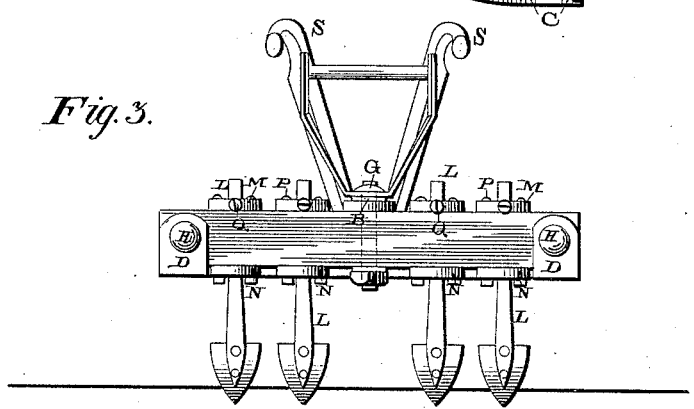

Figure 1 is a side elevation of a cultivator which embodies my invention. Fig. 2 is a plan view of the same. Fig. 3 is a rear view.

A represents the beam, which is connected by the straps or plates B, secured to its upper and lower edges, to the cross-piece C. The frame D is made semicircular and may be provided with a slot E, or not, as may be preferred. Through the beam A is made a vertical slot, and through this slot is passed the clevis F, by means of which the beam A and the frame D are clamped rigidly in any desired relation to each other, the beam being pivoted by means of the plates B and the bolt G, which passes through their rear ends and the cross-piece. The beam, when the nuts upon the upper screw-threaded ends of the clevis are loosened, can be adjusted either toward the right or the left and thus made to stand at any desired angle to the cross-piece and the frame, as may be desired. If the beam is moved at about an angle of forty-five degrees, the cultivator is in condition to be attached by means of a chain and cross-bar and used in connection with a similar implement, which is also adjusted as above described, and thus produce a double cultivator which will cultivate upon both sides of a row of growing plants at the same time.

The rear ends of the frame D are turned vertically upward and are secured by means of the clamping-bolts H to the cross-piece, which consists of the two metallic plates C and the blocks J placed between their ends for the purpose of separating them a suitable distance. Through the space in this cross-piece the upper ends of the shanks of the cultivators L extend, and by means of which slot the cultivator-shanks L can be adjusted laterally in relaton to each other for the purpose of placing them any desired distance apart. The upper edges of the cross-pieces are serrated, as shown, and the lower edges of the plates M, placed upon the top of the cross-piece, and through which the shanks of the cultivators extend, are also serrated, so that when the cultivators are adjusted in position there will be no danger of their becoming loose. Applied to the lower edges of the cross-piece are the plates N, through which the cultivator-shanks also pass, and both sets of plates M N are provided with curved slots O, through which the clamping-bolts P are are passed. These bolts P are screw-threaded at their lower ends so as to receive clamping-nuts upon them, and thus clamp the plates tightly against the edges of the cross-piece. By means of the slots O, after the nuts have been loosened upon the lower ends of the bolts P, the cultivators can be turned at any desired angle for the purpose of throwing the dirt toward or away from the plants. These cultivators can be raised or lowered through their plates M N at the will of the operator and rigidly held in any desired position by means of the set-screws Q, which are passed, preferably, through the upper plates M. By passing the shanks of the cultivators through the plates M N, as here shown, these cultivators can be adjusted laterally, vertically, and turned so as to stand in any desired relation to each other.

The handles S have their front ends secured near the front end of the beam and are supported at their rear ends by a double standard which is fastened in place upon the top of the rear end of the upper plates B by the bolt G.

By means of the clevis T the cultivators can be adjusted to run shallow or deep, as may be desired. The rear end of this clevis is provided with a series of perforations, through one of which and the beam a fastening-bolt is passed. It is only necessary to withdraw this clamping-bolt and turn the clevis upon its pivot, when any adjustment desired can be made.

Having thus described my invention, I claim—

1. In a cultivator, the combination of a semicircular frame, two vertical plates secured to the ends of the said frame and having their upper edges serrated, blocks placed between the plates, the plates M N, bolts for clamping them to opposite edges of the vertical plates, and the cultivators which pass through the plates M N and the beam, substantially as shown.

2. In a cultivator, the combination of a semicircular frame, the vertical plates secured to its ends, the blocks between the vertical plates, the plates M N, having central and circular openings, bolts which pass through the circular openings for clamping the plates to opposite edges of the vertical plates, the cultivators which pass through the central openings, clamping-screws in the plates M N for holding the cultivators, and the beam, substantially as described.

In testimony whereof I affix my signature in presence of two witnesses.

JOHN OWEN FORD.

Witnesses:
 JAMES R. HORN,
 JOSHUA FORD.